United States Patent [19]
Fan et al.

[11] Patent Number: 5,600,483
[45] Date of Patent: *Feb. 4, 1997

[54] THREE-DIMENSIONAL PERIODIC DIELECTRIC STRUCTURES HAVING PHOTONIC BANDGAPS

[75] Inventors: Shanhui Fan, Cambridge; Pierre R. Villeneuve, Arlington; John D. Joannopoulos, Belmont, all of Mass.; Robert D. Meade, Morris Twp., N.J.

[73] Assignee: Massachusetts Institute of Technology, Cambridge, Mass.

[ * ] Notice: The term of this patent shall not extend beyond the expiration date of Pat. No. 5,440,421.

[21] Appl. No.: 425,510

[22] Filed: Apr. 20, 1995

Related U.S. Application Data

[63] Continuation-in-part of Ser. No. 240,916, May 10, 1994, Pat. No. 5,440,421.

[51] Int. Cl.[6] .................................................. H01L 33/00
[52] U.S. Cl. ........................... 359/344; 257/17; 437/15
[58] Field of Search .......................... 359/344; 437/15, 437/235, 236, 915; 257/16, 17, 14, 21

[56] References Cited

U.S. PATENT DOCUMENTS

| | | |
|---|---|---|
| 4,015,893 | 4/1977 | Sugano et al. |
| 4,503,447 | 3/1985 | Iafrate et al. |
| 4,591,889 | 5/1986 | Gossard et al. |
| 4,799,749 | 1/1989 | Börner et al. |
| 4,817,102 | 3/1989 | Maurer et al. |
| 4,983,540 | 1/1991 | Yamaguchi et al. |
| 4,999,682 | 3/1991 | Xu et al. |
| 5,079,594 | 1/1992 | Mitsuyu et al. |

(List continued on next page.)

FOREIGN PATENT DOCUMENTS

| | | |
|---|---|---|
| 0486128A3 | 5/1992 | European Pat. Off. |
| WO92/15124 | 9/1992 | WIPO . |
| WO94/13029 | 6/1994 | WIPO . |
| WO94/15389 | 7/1994 | WIPO . |

OTHER PUBLICATIONS

Ho, K. M., C. T. Chan, C. M. Soukoulis, R. Biswas and M. Sigalas, "Photonic Band Gaps in Three Dimensions: New Layer–By–Layer Periodic Structures", *Solid State Communications*, vol. 89, No. 5, 1994, pp. 413–416.

Özbay, E., E. Michel, G. Tuttle, R. Biswas, M. Sigalas and K. M. Ho, "Micromachined Millimeter–Wave Photonic Band–Gap Crystals", *Applied Physical Letters*, vol. 64, No. 16, Apr. 18, 1994, pp. 2059–2061.

Sözüer, H. S., and Jonathan P. Dowling, "Photonic Band Calculations for Woodpile Structures", *Journal of Modern Optics*, vol. 41, No. 2, Feb. 1994, pp. 2–10+figures.

Sözüer, H. Sami, and Joseph W. Haus, "Photonic Bands: Simple–Cubic Lattice", *Journal of Optical Society of America*, vol. 10, No. 2, Feb. 1993, pp. 296–302.

Wendt, J. R., G. A. Vawter, P. L. Gourley, T. M. Brennan, and B. E. Hammons, "Nanofabrication of Photonic Lattice Structures in GaAs/AlGaAs", *Journal Vac. Sci. Technology*, vol. 11, No. 6, Nov./Dec. 1993, pp. 2837–2840.

Yablonovitch, E., T. J. Gmitter, and K. M. Leung, "Photonic Band Structure: The Face–Centered–Cubic Case Employing Nonspherical Atoms", *Physical Review Letters*, vol. 67, No. 17, Oct. 21, 1991, pp. 2295–2298.

*Primary Examiner*—Mark Hellner
*Attorney, Agent, or Firm*—Samuels, Gauthier, Stevens & Reppert

[57] ABSTRACT

A periodic dielectric structure and method of fabricating same, the structure having a three-dimensional photonic bandgap. The structure includes a plurality of layers, at least one layer having a stratum of a first material having a first dielectric constant and a plurality of parallel regions along a first axis lying in the plane of the layer, the regions including a second material having a second dielectric constant; and a plurality of parallel channels formed through the plurality of layers in a second axis orthogonal to the plane of the layers, the channels being adapted to comprise a third material having a third dielectric constant, thereby resulting in the structure having three-dimensional periodicity. In preferred embodiments, the second and third materials include air.

30 Claims, 9 Drawing Sheets

U.S. PATENT DOCUMENTS

| | | |
|---|---|---|
| 5,126,804 | 6/1992 | Nagai et al. . |
| 5,155,567 | 10/1992 | Haga et al. . |
| 5,166,826 | 11/1992 | Ruprecht . |
| 5,172,267 | 12/1992 | Yablonovitch . |
| 5,187,461 | 2/1993 | Brommer et al. . |
| 5,210,801 | 5/1993 | Fournier et al. . |
| 5,236,547 | 8/1993 | Takahashi et al. . |
| 5,332,681 | 7/1994 | Tonucci et al. . |
| 5,440,421 | 8/1995 | Fan et al. ................... 359/344 |

THREE-DIMENSIONAL PERIODIC DIELECTRIC STRUCTURES HAVING PHOTONIC BANDGAPS

This invention was made with government support under Contract Number DAAH04-93-G-0262 awarded by the United States Army, and Grant Number 9022933-DMR awarded by the National Science Foundation. The government has certain rights in the invention.

This is a continuation-in-part of application Ser. No 08/240,916 filed on May 10, 1994 now U.S. Pat. No. 5,440,421.

BACKGROUND OF THE INVENTION

Periodic dielectric structures, also known as photonic crystals, have the ability of affecting the density of electromagnetic states within their boundaries and even suppressing all modes for a range of frequencies. They can greatly affect the radiative dynamics within the structures and lead to significant changes in the properties of optical devices. This has opened a new and fascinating area for potential applications in optoelectronic devices and has prompted research to find structures that would generate large photonic bandgaps.

Several structures have been found to yield full 3D bandgaps. Examples of these structures are described in the following: Yablonovitch et al., "Photonic Band Structure: The Face-Centered-Cube Case Employing Nonspherical Atoms", Phys. Rev. Lett., Vol. 67, 2295 (1994); Sözüer et al., "Photonic Bands: Simple-Cubic Lattice", J. Opt. Soc. Am. B, Vol. 10, 296 (1993); Ho et al., "Photonic Band Gaps In Three Dimensions: New Layer-By-Layer Periodic Structures", Solid State Comm., Vol. 89, 413 (1994); Sözüer et al., "Photonic Band Calculations for Woodpile Structures", J. Mod. Opt., Vol. 41, 231 (1994); and Özbay et al., "Micromachined Millimeter-Wave Photonic Band-Gap Crystals", Appl. Phys. Lett., Vol. 64, 2059 (1994); all of which are incorporated herein by reference.

However, conventional fabrication at submicron lengthscales appears to be a difficult endeavor. The only apparent successful microfabrication of a photonic crystal has been reported by Wendt et al., "Nanofabrication of Photonic Lattice Structures in GaAs/AlGaAs", J. Vac. Sci. Tech. B, Vol. 11, 2637 (1993), incorporated herein by reference. The described structure consists of a triangular lattice of cylindrical holes. However, the structure is designed to give rise only to a 2D bandgap.

The primary difficulty with the microfabrication of a 3D photonic crystal comes from the rather sophisticated geometry and intricate arrangement of holes or rods required to open a gap. These complex structures do not easily lend themselves to fabrication at submicron lengthscales. Furthermore, most applications for photonic crystals require bandgaps larger than 10% which in turn requires the use of materials with large index contrasts.

SUMMARY OF THE INVENTION

The present invention provides a structure which solves all of the above problems in that it gives rise to large 3D gaps, its construction has an inherent simplicity, and it can be made with materials widely used in optoelectronic devices. In addition, experimental calculations show that the bandgaps are not very sensitive to the parameters of the structure. Therefore, deviations arising in the fabrication process should not significantly affect the results.

A primary objective of the present invention is to provide a relatively simple layered structure with a large index contrast that would require the etching of only one series of holes at normal incidence through the top surface of the layered structure. In addition, the etching process is done at the end of the growth procedure in order to simplify its fabrication.

Accordingly, the present invention provides a periodic dielectric structure and method of fabricating same, the structure having a three-dimensional photonic bandgap. The structure includes a plurality of layers, at least one layer having a stratum of a first material having a first dielectric constant and a plurality of parallel regions along a first axis lying in the plane of the layer, the regions including therein a second material having a second dielectric constant; and a plurality of parallel channels formed through the plurality of layers in a second axis orthogonal to the plane of the layers, the channels being adapted to comprise a third material having a third dielectric constant, thereby resulting in the structure having three-dimensional periodicity. In preferred embodiments, the second and third materials comprise air.

DETAILED DESCRIPTION OF THE ILLUSTRATED EMBODIMENTS

Figure 1:
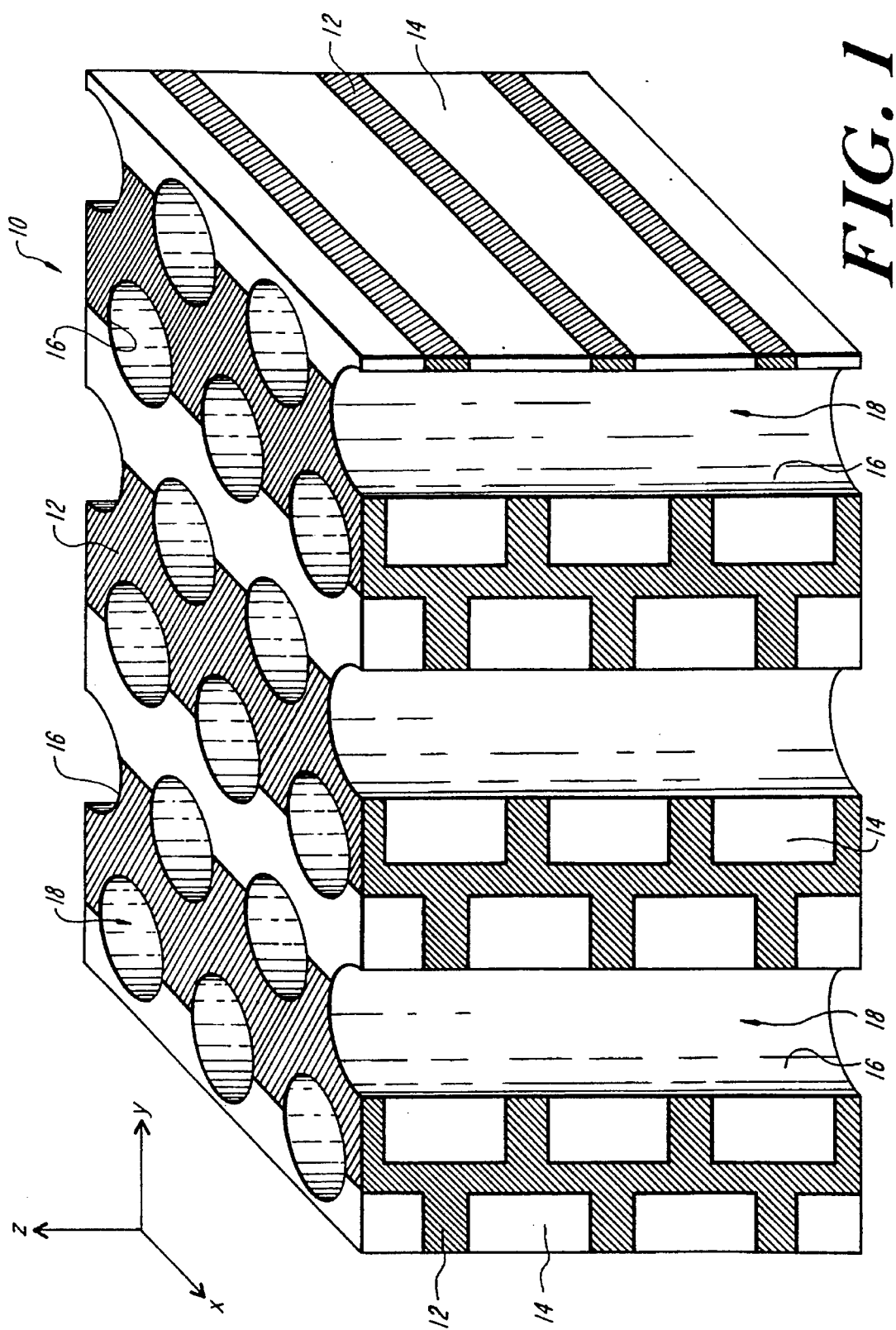
FIG. 1 shows a perspective view of a three-dimensional periodic dielectric structure in accordance with the present invention.

A three-dimensional periodic dielectric structure (photonic crystal) 10 is shown in FIG. 1. The structure 10 is essentially a layered structure made of a first material 12 having a first dielectric constant and interlayed parallel rows along the illustrated x-axis of a second material 14, preferably having a second dielectric constant different than the first dielectric constant. According to an exemplary embodiment, the first material is silicon and the second material is silicon dioxide. The structure 10 also includes a series of parallel channels 16 or columns fabricated through the structure in the illustrated z-axis for containing a third material 18 having a second dielectric constant which preferably has a large index contrast with the first dielectric constant. The use of the air columns (dielectric constant of 1) is preferred in order to provide the desired large index contrast between the different materials.

The structure 10 can be microfabricated by growing it layer by layer using conventional lithographic techniques. It is expected that ten layers should be sufficient, although some applications may require a smaller or larger number of layers. A generic fabrication process of the structure is described with reference to FIGS. 2A–2E. The illustrated sequence of growth steps is presented for illustrative purposes in order to enhance visualization of the basic elements that make up the structure 10, and does not have the pretension of describing the exact building process. In addition, for exemplary purposes, silicon, silicon dioxide and air will be used as the first, second and third materials, respectively.

Figure 2A:
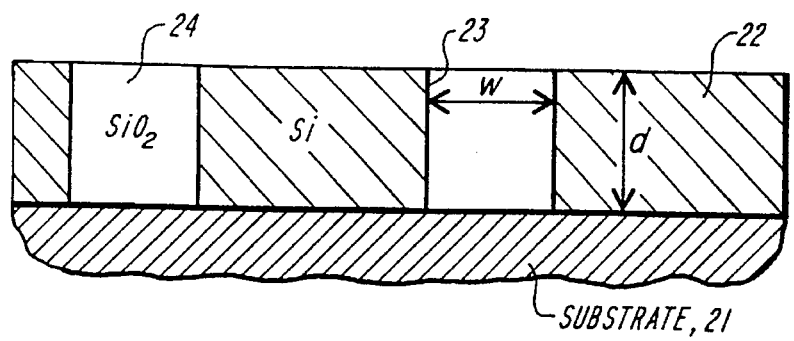
FIGS. 2A–2E show the step process of fabricating the three-dimensional periodic dielectric structure of the present invention.
Figure 2B:
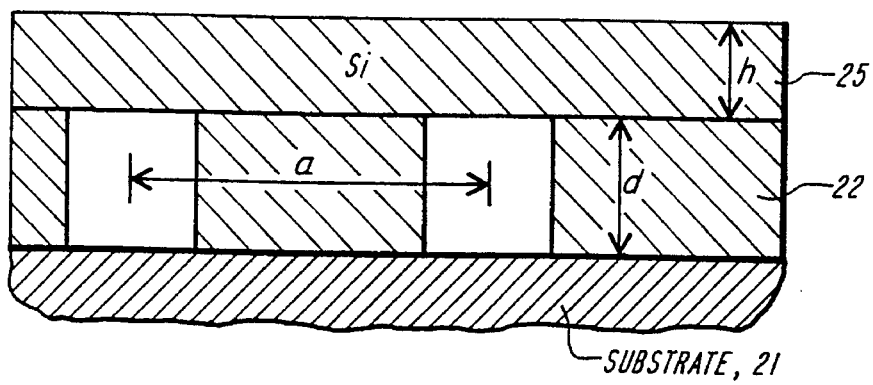
Figure 2C:
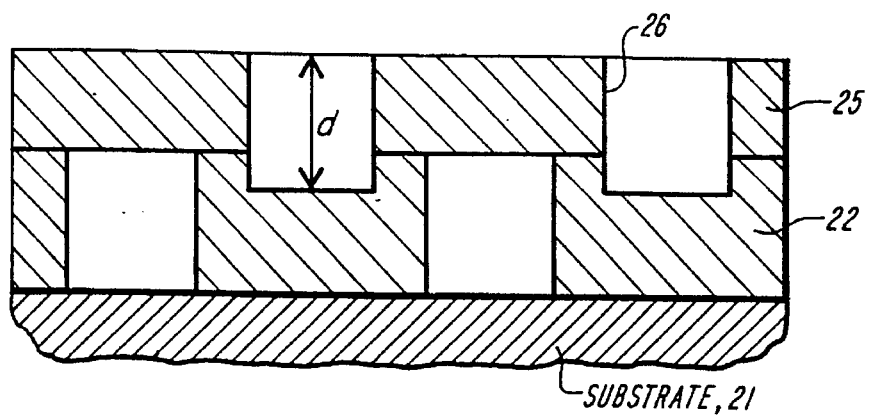

The process begins by depositing a layer 22 of silicon of thickness d on a substrate 21 of choice and by etching grooves 23 into the Si layer as shown in FIG. 2A. The grooves run parallel to the x-axis and are separated by a distance a; and have a depth d and a width w. The grooves 23 are then filled with the second material 24, $SiO_2$. The next step consists in growing another layer 25 of Si layer of height h on top of the previous layer, as shown in FIG. 2B, and etching additional grooves 26 of depth d and width w into this layer along the x-axis, as shown in FIG. 2C.

Figure 2D:
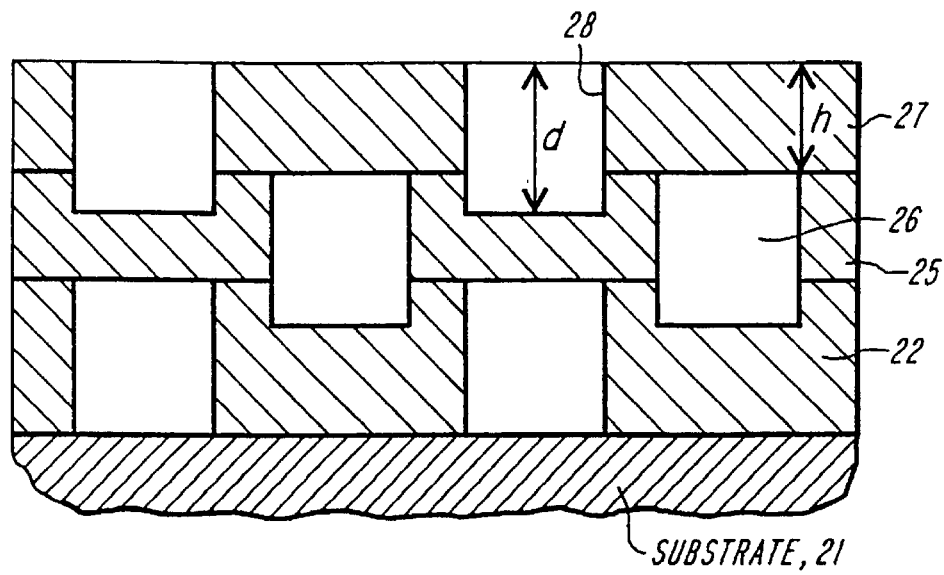

It will be appreciated that these grooves may extend into the first layer and are translated by a distance a/2 with respect to the grooves in the previous layer. After filling the grooves 26 with $SiO_2$, another Si layer 27 of height h is deposited on the top surface and long parallel grooves 28 are etched therein. The grooves are translated again by a distance a/2 with respect to the previous layer, as shown in FIG. 2D. From this point on, the structure repeats itself every two layers.

Figure 2E:
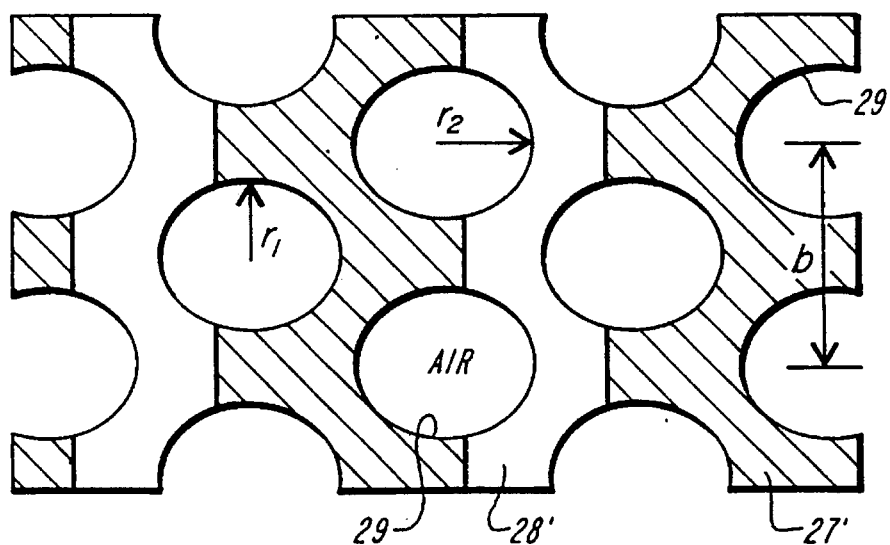

Once the layering process is completed to layer 27' and filled grooves 28', an array of parallel channels 29 or holes is etched into the top surface and through the structure, at normal incidence, along the z-axis. In general, the cross section of the holes can be of any shape. A preferred embodiment would involve either circular or elliptical holes with parameters $r_1$ and $r_2$, as shown in FIG. 2E. In the exemplary embodiment, the holes form a centered rectangular lattice on the top surface, and are separated by a distance b along the x-axis and the distance a along the y-axis. In the embodiment illustrated, the center of each hole 29 is aligned in the structure as shown in FIG. 2E, preferably with the shortest of such distances being a/4 from the center of any one filled groove.

Accordingly, the overall structure 10 is body centered orthorhombic with lattice constants b, a and 2h along the x-, y- and z-axes, respectively. In addition, the structure has a point group which includes three 180° rotation operators about the x-, y- and z-axes. In the special case where a =b√2=2h√2, the lattice becomes face centered cubic.

The design of the structure 10 has many degrees of freedom which can be used to optimize the size of the photonic bandgap, depending on the materials used in the fabrication. Although Si and $SiO_2$ were used in the above example, these materials can be replaced by other materials having a large index contrast. It is convenient to choose one of the lattice constants as the unit length scale; for example, initially the dimension a can be chosen, and thereafter every other parameter can be defined with respect to it. The size of the structure 10 can then be scaled to any wavelength simply by scaling a.

Figure 3A:
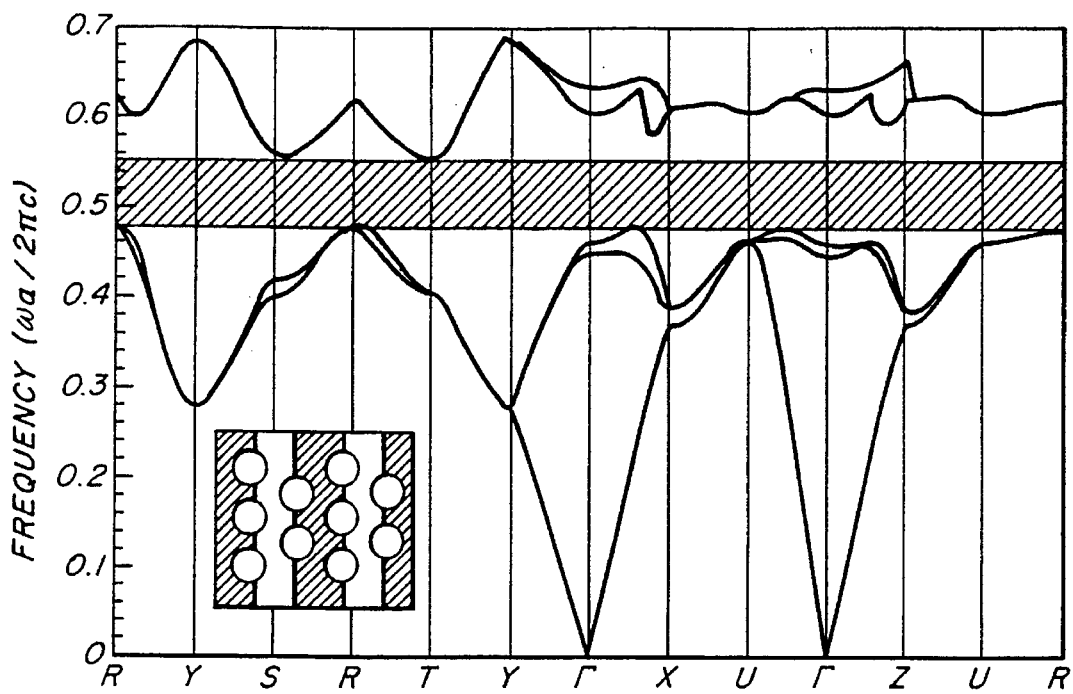
FIGS. 3A and 3B respectively show bandgap diagrams for alternate embodiments of the three-dimensional periodic dielectric structure of the present invention.

In the specific case where Si and $SiO_2$ are used in the fabrication process, the bandgap is found to be 13.9% of the midgap frequency when the width and depth of the $SiO_2$-filled grooves were 0.40a and 0.49a, respectively. Furthermore, the cross-section of the air columns was chosen to be circular with a radius of 0.21a. The other parameters used to optimize the gap were b=0.71a and h=0.35a. The band diagram is shown in FIG. 3A along various directions in the irreducible Brillouin zone. Without any loss in generality, a Brillouin zone is chosen, for simplicity, which is associated with a simple orthorhombic lattice. A dielectric constant of 12.096 for Si at λ=1.53 μm (10) and 2.084 for amorphous $SiO_2$ also at 1.53 μm (10) is used. This wavelength is approximately equal to the one used in many optical devices today. In the case where the gap is centered at 1.53 μm (f=196 THz), a is equal to 0.79 μm and the gap extends from λ=1.43 μm to λ=1.64 μm (f=182 THz to f=210 THz).

The bandgap is not very sensitive with respect to either the cross-sectional dimensions of the grooves or the air columns. By changing both the width and depth of the $SiO_2$-filled grooves, the gap remains larger than 13% for values of w between 0.35a and 0.40a and d between 0.45a and 0.51a. On the other hand, the cross-section of the air columns could be made elliptical with the major axis aligned either along the x- or y-axis without affecting the gap significantly. For example, the gap increases slightly to 14% if $r_1$=0.21a and $r_2$=0.23a.

Figure 3B:
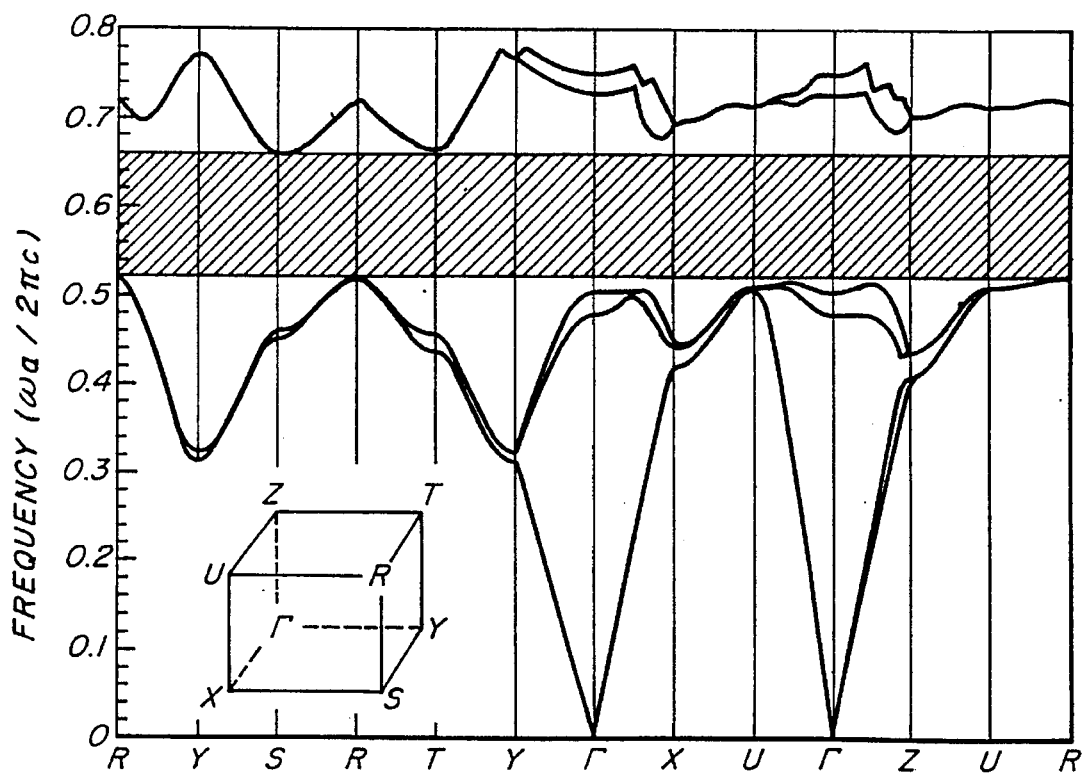

A very significant improvement could be made to the size of the bandgap simply by removing the second material 14 from the structure 10. For example, the removal of the silicon dioxide would increase the dielectric contrast between the silicon and the other materials in the structure, and would leave long holes with rectangular cross-section filled with air along the x-axis. The removal of the second material could be done, for example, with selective chemical etching. More specifically, if the oxide was removed from the structure presented in FIG. 3A, the gap would increase to 17%. The gap could be further increased by optimizing the parameters, for example a gap of 23% is found in the Si/air structure with w=0.36a, d=0.51a and $r_1$=$r_2$=0.24a. The corresponding bandgap diagram is shown in FIG. 3B. Again, the gap remains very large even if all four parameters are changed slightly. The gap remains larger than 20% for values of w between 0.35a and 0.38a, d between 0.47a and 0.51a, $r_1$ between 0.23a and 0.25a and $r_2$ between 0.21a and 0.25a.

Accordingly, a new class of photonic crystals designed specifically for fabrication at submicron wavelengths is provided with the present invention. These crystals give rise to three-dimensional bandgaps as large as 23%.

Figure 4A:
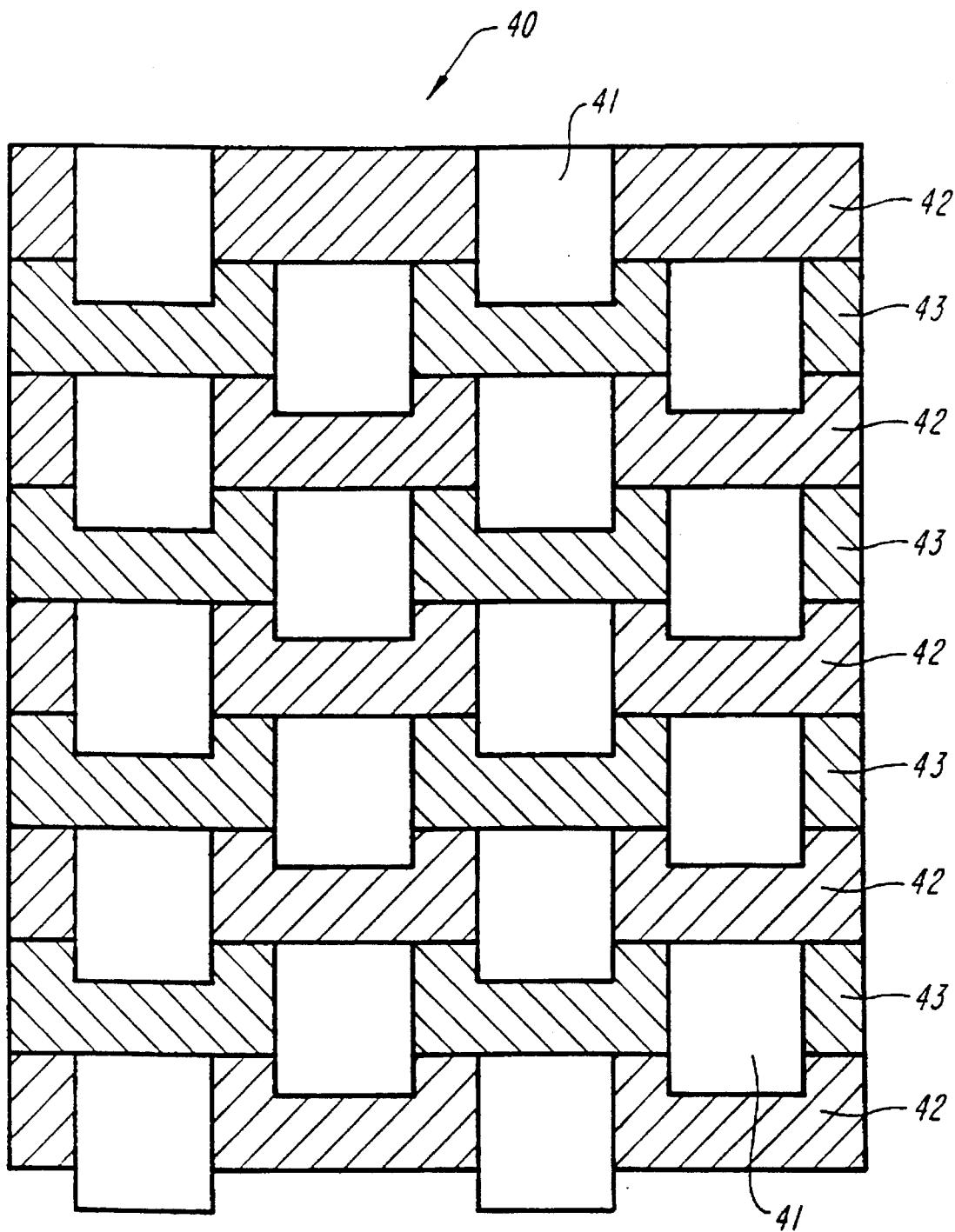
FIGS. 4A–C show alternative exemplary embodiments of a three-dimensional periodic dielectric structure in accordance with the present invention in which layers of various materials are utilized.
Figure 4B:
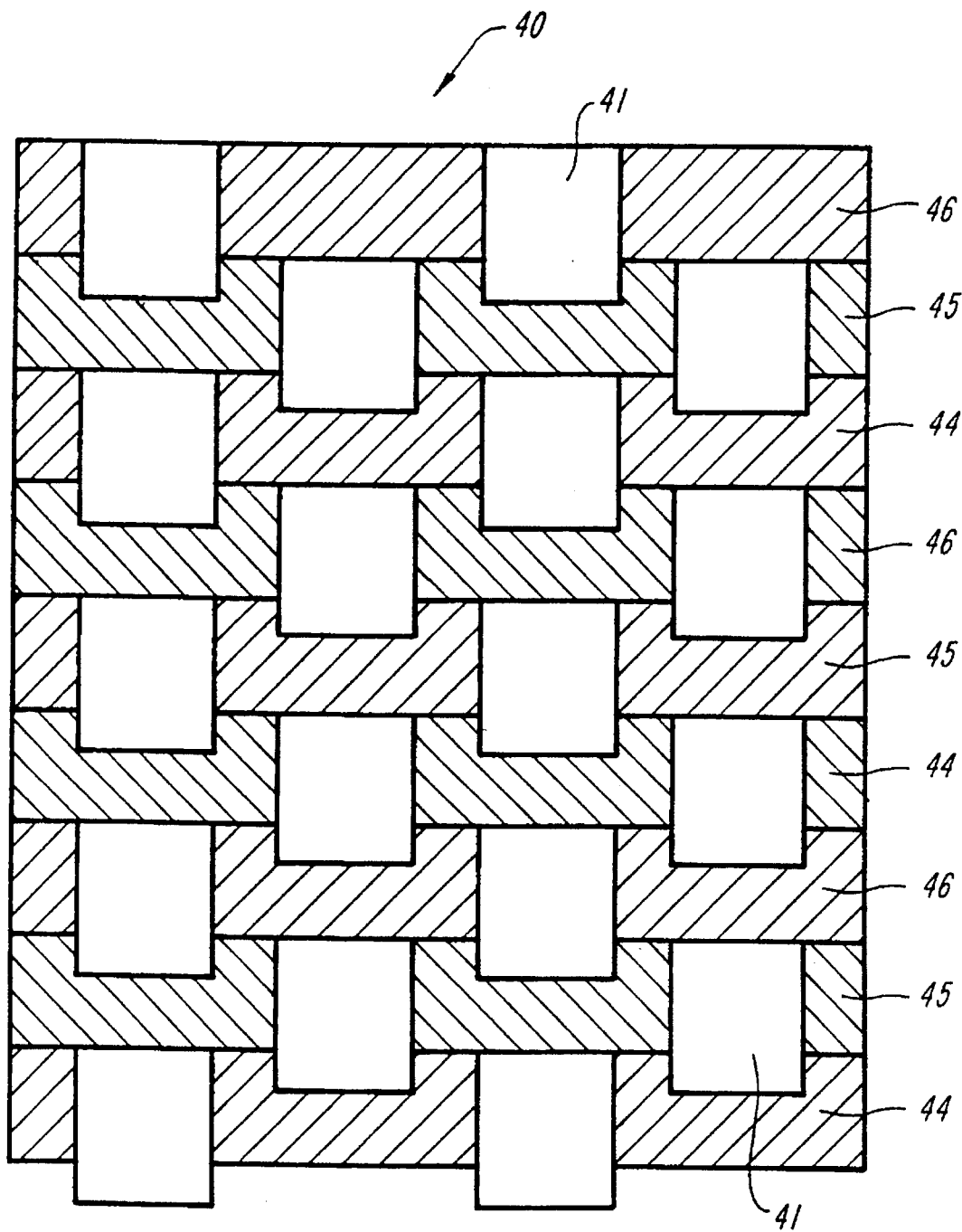
Figure 4C:
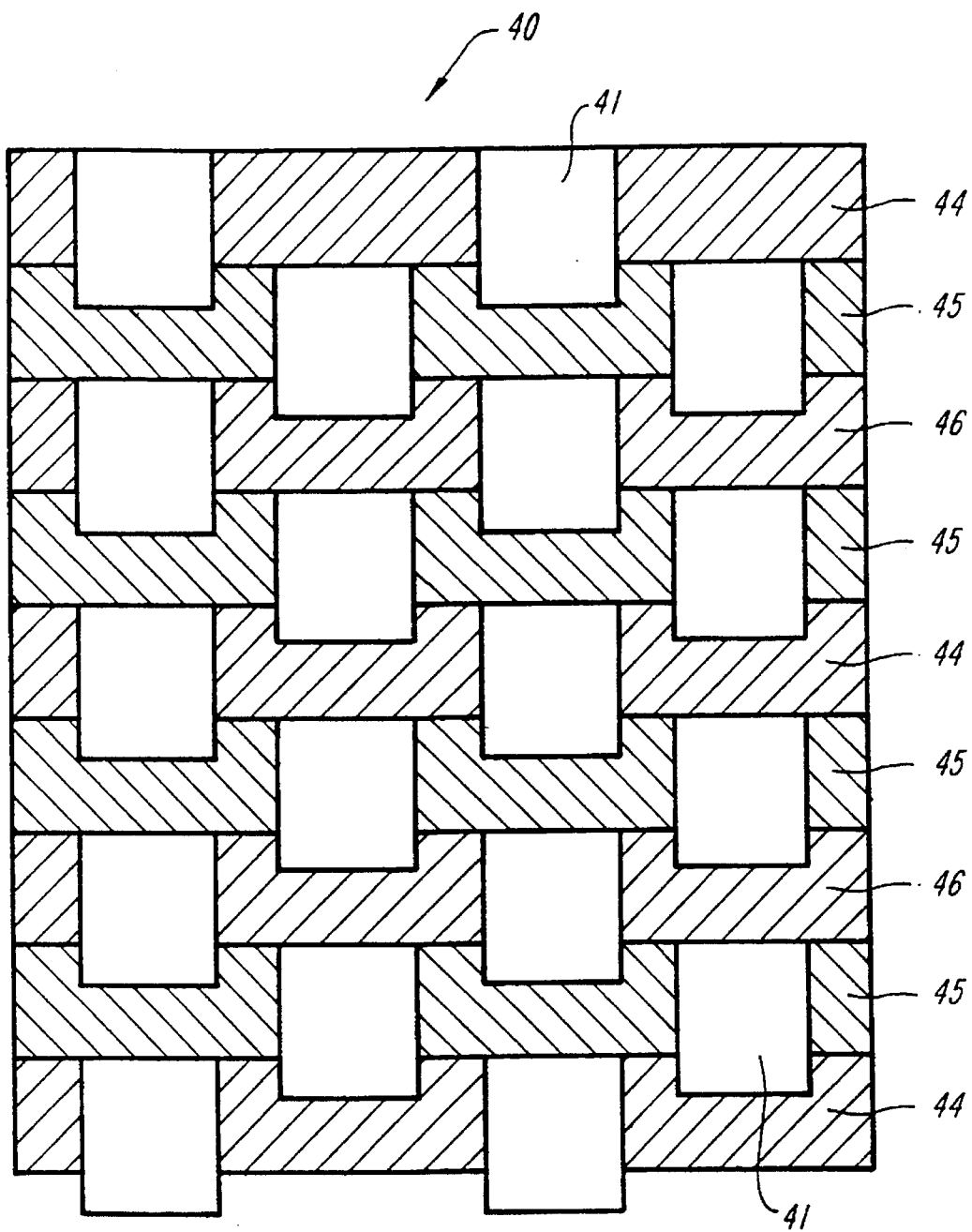

It was shown in the exemplary embodiment illustrated in FIG. 2 that the layers 22, 25, 27 and 27' were all made of the same material. In accordance with an alternative exemplary embodiment of the present invention as shown in FIGS. 4A–C, a structure 40 in accordance with the present invention is fabricated with layers of different material. In FIG. 4A, a layer 42 and a layer 43, of different materials, are used in the fabrication of the layers. These materials are made to alternate successively from one layer to the next. For example, the layers 42 and 43 include GaAs and $Al_xGa_{1-x}As$. The grooves 41 are produced utilizing the previously described etching techniques. Thus, the grooves may remain air-filled or filled with another material for periodicity.

In FIGS. 4B and 4C, further alternative exemplary embodiments of the present invention are illustrated in which layers of three different materials 44, 45 and 46 are used in the fabrication of the structure 40. For example, in addition to the layers of GaAs and $Al_xGa_{1-x}As$, a layer of $Al_yGa_{1-y}As$ for $x \neq y$ or Ge is used. These materials can be made to alternate in several different ways. In FIG. 4B, the materials alternate in a sequence 44, 45, 46, 44, 45, 46, etc., while in FIG. 4C, they alternate as 44, 45, 46, 45, 44, 45, 46, 45, 44, etc. As long as the layering sequence is repetitive or periodic, the overall structure will be periodic. In a further alternative exemplary embodiment, each of the grooves 41 is filled with a periodic sequence of differing materials.

Referring once again back to FIG. 2, it was shown that the long grooves 23, 26, 28 and 28' are filled with a second material. In the exemplary embodiment illustrated in FIG. 2, the second material was chosen to be $SiO_2$. Filling the grooves with $SiO_2$ allows each Si layer to be grown on top of the previous one; $SiO_2$ was used to support the Si layers. However, in the case of certain materials (including Si and $SiO_2$ or $Al_xGa_{1-x}As$ and GaAs), it may be possible to grow the layers of the first material without having to back fill the grooves with a second material. It has been discovered that when a layer of, for example, $Al_xGa_{1-x}As$ is applied to a grooved GaAs layer under specific conditions, the $Al_xGa_{1-x}As$ will not fill up the grooves, thus leaving the necessary air filled grooves or columns.

Figure 5:
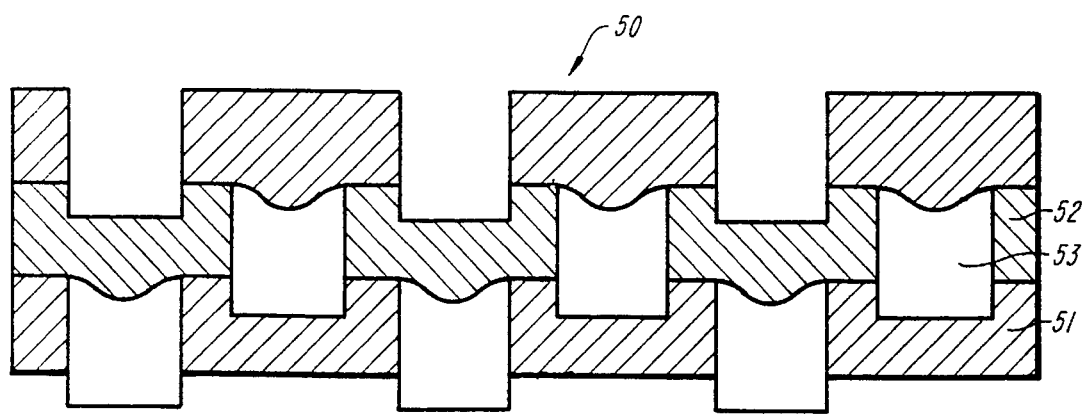
FIG. 5 shows an alternative exemplary embodiment of a periodic structure in accordance with the present invention in which successive layers do not fill in the formed grooves of previous layers.

FIG. 5 shows an alternative exemplary embodiment of the fabrication process in accordance with the present invention where the grooves are not back filled with a second material. The growth process of each successive layer 51 and 52 of a structure 50 can be controlled such that the material does not fill up the grooves 53. This process has the advantage of reducing the number of growth steps required to build the ultimate structure by eliminating the need to back fill the grooves.

The implanting of ions in a material (such as that which occurs during oxidization) allows one to change the properties of that material. In accordance with yet another alternative exemplary embodiment of the present invention, instead of etching long grooves into each layer, it is possible to implant ions locally. During the fabrication process, ions can be implanted into each layer, where grooves would have otherwise been etched. Hence, instead of etching and back filling grooves, ions are implanted locally in a series of long channels, with the same width and depth as those of the grooves.

Figure 6:
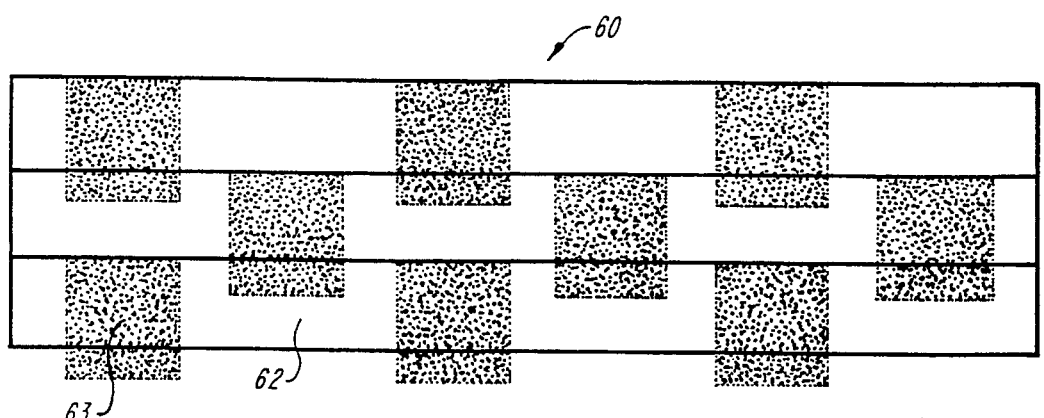
FIG. 6 shows an alternative exemplary embodiment of a periodic structure in accordance with the present invention in which ion implants are utilized to form the grooves.

The fabrication process and resultant structure 60 is shown in FIG. 6. A layer 62 of a first material is grown on a substrate. Ions 63 are then implanted into that layer using conventional well known ion implantation techniques. Another layer 62 is grown on top of the first one and ions are implanted again, shifted by a distance of a/2, as was shown in FIG. 2. From that point on, the structure repeats itself every other layer. At the end of the growth process, the air columns can be etched from the top surface of the structure and the ionized material can be removed with selective etching as previously described. In accordance with an alternative aspect of this embodiment, the air columns could be fabricated by using the same implant process as that used to fabricate the grooves. After the growth of each layer, ions can be implanted at the position of the air columns. This would allow both the grooves and the columns to be emptied with selective etching at the end of the growth process.

Instead of using a fabrication process which requires each layer to be grown successively on the top of the previous one, it will be appreciated by those of skill in the art that it is possible to fabricate each layer separately and assemble these layers into a stack. Each layer consists of a membrane, for example of silicon. By stacking up a series of membranes, it is possible to fabricate the structure shown in FIG. 1. An exemplary embodiment of such a membrane 70 is shown in FIG. 7A.

Figure 7B:
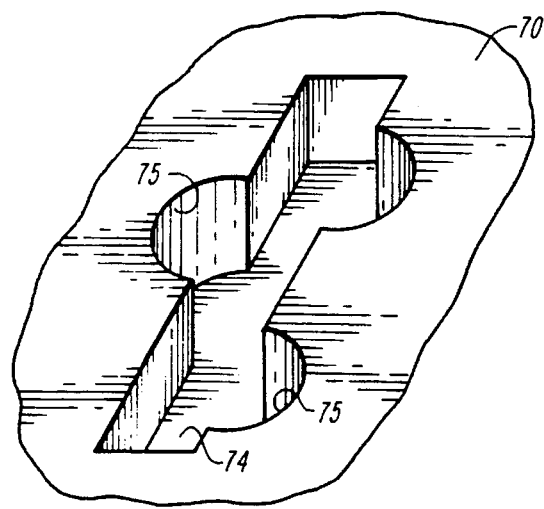
FIG. 7 shows an alternative exemplary embodiment of a periodic structure in accordance with the present invention in which prefabricated membranes with preformed grooves are utilized in construction.
Figure 7A:
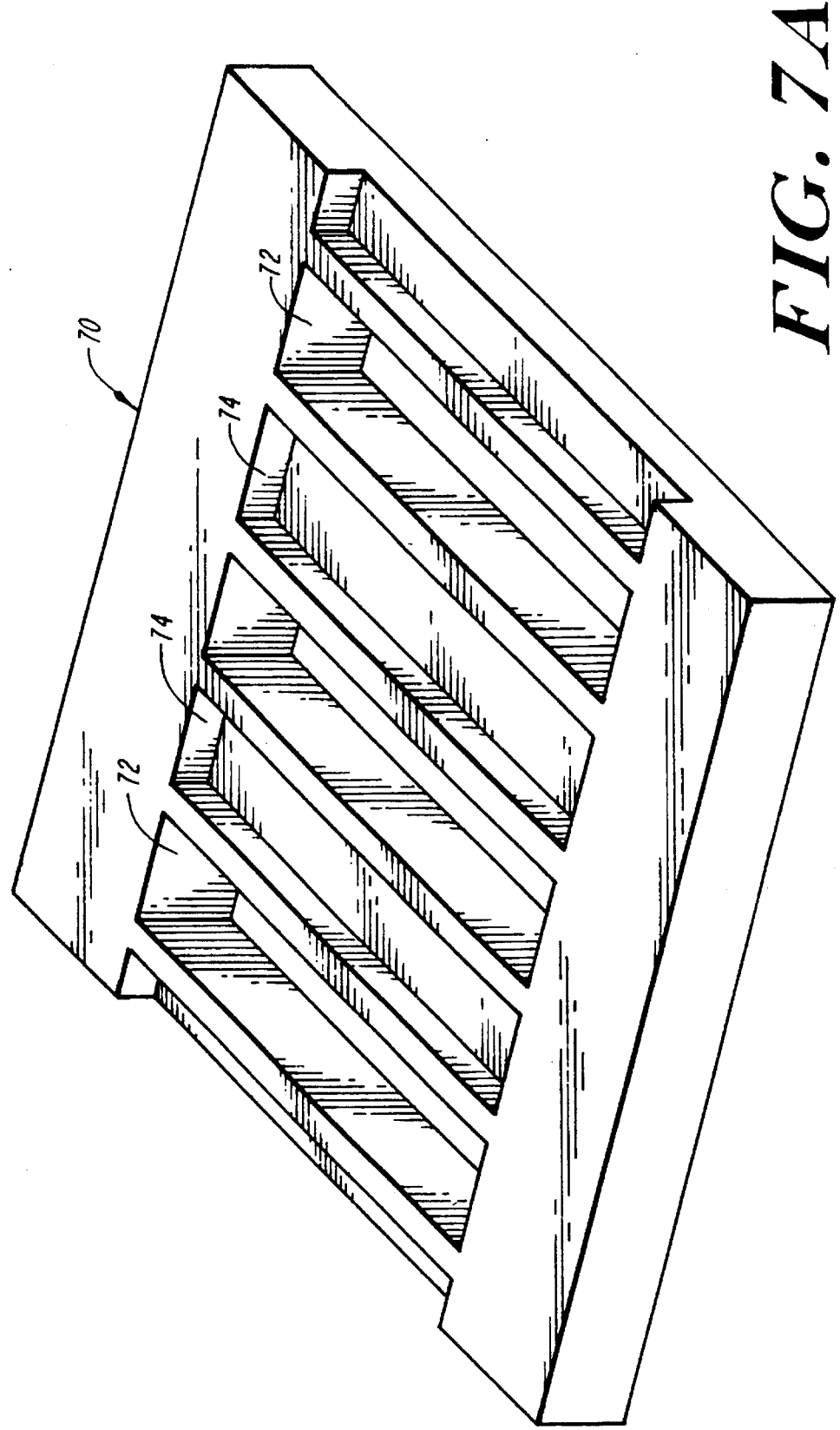

As shown in FIG. 7A, half of the grooves 72 are etched completely through the membrane. The other half of the grooves 74 are only partially etched into the membrane. If a plurality of membranes 70 are stacked in such a way that the deep grooves 72 are aligned with the shallow grooves 74, then the overall structure will in effect include grooves which extend into the membranes below. Thereafter, the air columns can be created by the aforementioned techniques. Alternatively, the prefabricated grooves 72, 74 of the membrane 70 can be shaped to include formations 75 as shown in FIG. 7B, so that the channels or air columns are produced during the stacking of the membranes, thus precluding the need for further etching.

The foregoing description has been set forth to illustrate the invention and is not intended to be limiting. Since modifications of the described embodiments incorporating the spirit and substance of the invention may occur to persons skilled in the art, the scope of the invention should be limited solely with reference to the appended claims and equivalents thereof.

What is claimed is:

1. A method of fabricating a periodic dielectric structure having a three-dimensional photonic bandgap, said method comprising:

(a) providing a substrate;

(b) applying a layer of a first material having a first dielectric constant on said substrate;

(c) forming a plurality of parallel regions along a first axis lying in the plane of said layer;

(d) filling said plurality of regions with a second material having a second dielectric constant;

(e) applying a further layer to overlie the previous layer of first material and filled regions;

(f) repeating steps (c)–(e) a predetermined number of times to form a multi-layered structure; and (g) forming a plurality of parallel channels through said multi-layered structure in a second axis orthogonal to the plane of the layers, said channels being adapted to comprise a third material having a third dielectric constant, thereby resulting in said structure having three-dimensional periodicity.

2. The method of claim 1, wherein step (g) further comprises the step of utilizing air as said third material.

3. The method of claim 1, wherein steps (b) and (e) further comprise the step of depositing silicon as said first material.

4. The method of claim 3, wherein step (d) further comprises the step of depositing silicon dioxide as said second material.

5. The method of claim 4, wherein said substrate comprises silicon.

6. The method of claim 1, wherein steps (b) and (e) further comprise the step of depositing gallium arsenide as said first material.

7. The method of claim 6, wherein step (d) further comprises the step of depositing aluminum gallium arsenide as said second material.

8. The method of claim 7, wherein said substrate comprises gallium arsenide.

9. The method of claim 1 further comprising the step of removing said second material from said structure.

10. The method of claim 1, wherein said further layers of said first material comprise a height h, and said regions filled with said second material comprise a depth d and width w, wherein d is equal to or greater than h, such that said regions extend into a previous layer of said first material.

11. The method of claim 10, wherein said regions associated with any one layer of first material are separated by a distance a, and grooves associated with previous or subsequent layers of said first material are translated by a distance of a/2.

12. The method of claim 11, wherein said channels are separated along said first axis by a distance b, and are separated by said distance b along a third axis perpendicular to each of said first and second axes.

13. The method of claim 1, wherein said structure is fabricated at submicron lengthscales.

14. The method of claim 13, wherein said bandgap is fabricated to be in the range from 14% to 23% of the midgap frequency.

15. A periodic dielectric structure having a three-dimensional photonic bandgap, comprising:

a plurality of layers, at least one of said layers including a stratum of a first material having a first dielectric constant and a plurality of parallel regions along a first axis in the plane of said layer, said regions comprising a second material having a second dielectric constant; and a plurality of parallel channels formed through said plurality of layers in a second axis orthogonal to the plane of the layers, said channels being adapted to comprise a third material having a third dielectric constant, thereby resulting in said structure having three-dimensional periodicity.

16. The structure of claim 15, wherein said third material comprises air.

17. The structure of claim 16, wherein said second material comprises air.

18. The structure of claim 16, wherein said first material comprises silicon and said second material comprises silicon dioxide.

19. The structure of claim 16, wherein said first material comprises gallium arsenide and said second material comprises aluminum gallium arsenide.

20. A method of fabricating a periodic dielectric structure having a three-dimensional photonic bandgap, said method comprising:

forming a plurality of layers, at least one of said layers including a stratum of a first material having a first dielectric constant and a plurality of parallel regions along a first axis lying in the plane of said layer, said regions comprising a second material having a second dielectric constant; and forming a plurality of parallel channels through said plurality of layers in a second axis orthogonal to the plane of the layers, said channels being adapted to comprise a third material having a third dielectric constant, thereby resulting in said structure having three-dimensional periodicity.

21. A method of fabricating a periodic dielectric structure having a three-dimensional photonic bandgap, said method comprising the steps of:

(a) providing a substrate;

(b) applying a layer of a first material having a first dielectric constant on said substrate;

(c) forming a plurality of parallel regions along a first axis lying in the plane of said layer, said regions being configured to comprise a second material having a second dielectric constant;

(d) applying a further layer to overlie the previous layer and regions;

(f) repeating steps (c) and (d) a predetermined number of times to form a multi-layered structure; and (g) forming a plurality of parallel channels through said multi-layered structure in a second axis orthogonal to the plane of the layers, said channels being configured to comprise a third material, thereby resulting in said structure having three-dimensional periodicity.

22. The method of claim 21, wherein said second and third material comprise the same material.

23. The method of claim 21, wherein said second and third material comprise different materials.

24. A periodic dielectric structure having a three-dimensional photonic bandgap comprising:

a plurality of integrally joined layers, at least one of said layers including a stratum of a first material having a first dielectric constant and a plurality of parallel regions along a first axis in the plane of said layer, said grooves being configured to comprise a second material having a second dielectric constant; and a plurality of parallel channels formed through said plurality of layers in a second axis orthogonal to the plane of the layers, said channels being configured to comprise a third material, thereby resulting in said structure having three-dimensional periodicity.

25. The structure of claim 24, wherein said second and third material comprise the same material.

26. The structure of claim 24, wherein said second and third material comprise different materials.

27. A method of fabricating a periodic dielectric structure having a three-dimensional photonic bandgap, said method comprising:

forming a plurality of integrally joined layers, at least one of said layers including a stratum of a first material having a first dielectric constant and a plurality of parallel regions along a first axis lying in the plane of said layer, said regions being configured to comprise a second material having a second dielectric constant; and forming a plurality of parallel channels through said plurality of layers in a second axis orthogonal to the plane of the layers, said channels being configured to comprise a third material, thereby resulting in said structure having three-dimensional periodicity.

28. The method of claim 27, wherein said second and third material comprise the same material.

29. The method of claim 27, wherein said second and third material comprise different materials.

30. The method of claim 27, wherein said steps of forming said plurality of integrally joined layers and said plurality of parallel channels through said plurality of layers occur simultaneously.

* * * * *